(12) United States Patent
Azizi et al.

(10) Patent No.: US 9,407,732 B2
(45) Date of Patent: Aug. 2, 2016

(54) METHODS AND ARRANGEMENTS TO DECODE COMMUNICATIONS

(71) Applicant: Intel Corporation, Santa Clara, CA (US)

(72) Inventors: Shahrnaz Azizi, Cupertino, CA (US);
Eldad Perahia, Portland, OR (US);
Thomas J. Kenney, Portland, OR (US);
Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 606 days.

(21) Appl. No.: 13/685,631

(22) Filed: Nov. 26, 2012

(65) Prior Publication Data

US 2014/0146722 A1    May 29, 2014

(51) Int. Cl.
*H04L 29/06* (2006.01)
*H04L 27/26* (2006.01)

(52) U.S. Cl.
CPC ............. *H04L 69/22* (2013.01); *H04L 27/2647* (2013.01)

(58) Field of Classification Search
None
See application file for complete search history.

(56) References Cited

U.S. PATENT DOCUMENTS

| 6,697,337 | B1 | 2/2004 | Cafarelli et al. | |
|---|---|---|---|---|
| 2006/0078001 | A1 | 4/2006 | Chandra et al. | |
| 2008/0186890 | A1* | 8/2008 | Shao et al. | 370/311 |
| 2011/0194475 | A1 | 8/2011 | Kim et al. | |

FOREIGN PATENT DOCUMENTS

| EP | 2 088 706 A2 | 8/2009 |
|---|---|---|
| WO | 2014/081477 A1 | 5/2014 |

OTHER PUBLICATIONS

International Preliminary Report on Patentability and Written Opinion Received for PCT Patent Application No. PCT/US2013/048823, mailed on Jun. 4, 2015, 8 pages.
International Search Report and Written Opinion received for PCT Patent Application No.PCT/US2013/048823, mailed on Oct. 18, 2013, 11 pages.

* cited by examiner

*Primary Examiner* — Jason Mattis
*Assistant Examiner* — Hong Shao
(74) *Attorney, Agent, or Firm* — Schubert Law Group PLLC

(57) ABSTRACT

Embodiments may comprise logic such as hardware and/or code to reduce power consumption by, e.g., a device such as a station or relay by implementing prediction logic to decode and determine whether a communication affects the operation of the device. Some embodiments may comprise logic to receive at least a portion of a header of a frame from a physical layer and begin to decode the portion of the header of the frame without first checking the correctness of the value in the frame check sequence field. In many embodiments, prediction logic may determine whether the frame could have an impact on the operation of the device. For circumstances in which the prediction logic determines that the frame will not have an impact, the MAC logic may terminate processing, receipt, and decoding of the frame and enter the device into a low power consumption state.

28 Claims, 7 Drawing Sheets

METHODS AND ARRANGEMENTS TO DECODE COMMUNICATIONS

BACKGROUND

Embodiments are in the field of wireless communications. More particularly, embodiments relate to decoding communications by wireless receivers.

DETAILED DESCRIPTION OF EMBODIMENTS

Figure 1:
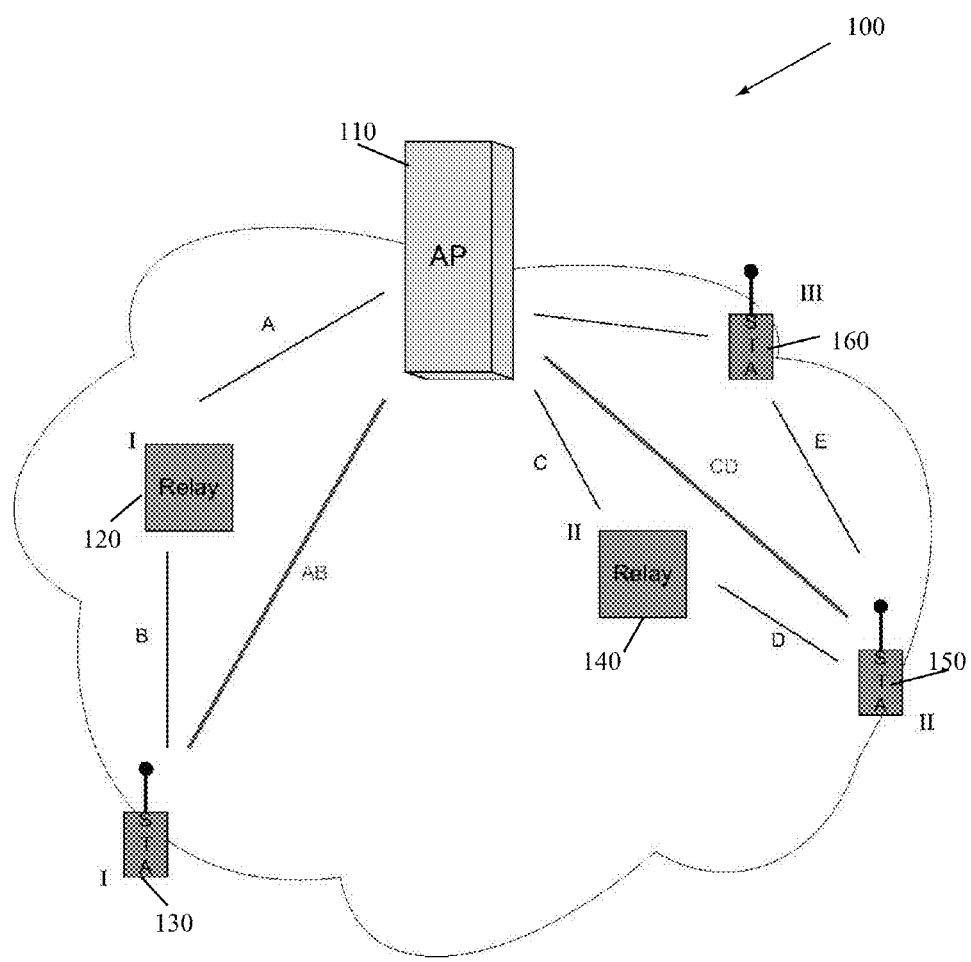
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Generally, embodiments include methods and arrangements to decode communications. Embodiments may comprise logic such as hardware and/or code to reduce power consumption by, e.g., low power devices such as stations and relays by implementing logic to decode and determine whether a communication affects the operation of the device. Some embodiments may comprise medium access control (MAC) logic to receive at least a portion of a header of a frame from a physical layer and begin to examine the portion of the header of the frame without first checking the correctness of the value in the cyclic redundancy field. In several embodiments, logic of the physical layer may store frame type and subtype values in a buffer as a frame is decoded and communicate one or more addresses of the frame immediately to the MAC logic as the addresses are decoded from the frame. In many embodiments, prediction logic may be part of the MAC sublayer of the data link layer and may determine whether the frame might have an impact on the operation of the device. In many embodiments, the MAC logic is part of the MAC sublayer (so it is referred to as MAC sublayer logic) and may only examine a portion of the header of the frame before determining that the frame has no impact on the operation of the receiver. In some embodiments, the MAC logic may process selected fields from the header portion of the frame to determine that the frame has no impact on the operation of the receiver.

For circumstances in which the prediction logic determines that the frame will not have an impact, the MAC logic may terminate receipt and decoding of the frame and return the device to a low power consumption state without having processed a frame body of the frame or the frame check sequence field of the frame. For instance, if the MAC address(es) of the header of the frame, the frame type and subtype values, and potentially other field values do not indicate that the frame will have an impact on the operation of the device then the device may assume that either there is a CRC error in the packet received or that the device has correctly determined that the frame will not have an impact of the operation of the device.

For circumstances in which the prediction logic determines that the frame might have an impact, the MAC logic may process the remaining portion of the frame including the frame body, if applicable, and the frame check sequence field; perform the CRC of the frame; and parse the values of the frame to determine the content of the frame. For instance, a clear to send (CTS) frame or a ready to send (RTS) frame may not have addresses that are related to the device but the network allocation vector (NAV) of such frames may impact the operation of the device since the device may defer transmissions for the time duration indicated by the NAV.

Various embodiments may be designed to address different technical problems associated with power consumption of devices. For instance, some embodiments may be designed to address one or more technical problems such as wake time of a device associated with determining whether a communication is directed toward or otherwise impacts the operation of the device. The technical problem of determining whether a communication is directed toward or otherwise impacts the operation of the device may involve examining values of fields as the fields are being decoded by the physical layer and, in some embodiments, examining selected field values of the header of the frame in an order and/or as the fields are being decoded by the physical layer.

Different technical problems such as those discussed above may be addressed by one or more different embodiments. For instance, some embodiments that are designed to address determining whether a communication is directed toward or otherwise impacts the operation of the device may do so by one or more different technical means such as prediction logic to predict whether a frame impacts the operation of a device by examining particular field values as those values are decoded. Further embodiments that are designed to determining whether a communication is directed toward or otherwise impacts the operation of the device may do so by one or more different technical means such as entering a mode in which the physical layer (PHY) passes particular field values to the MAC sublayer logic while other field values may be stored in a buffer.

Some embodiments implement a 1 Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest PHY rate is used for beacon and control frame transmissions. Although lowering the data rate may increase the transmission range, it takes much longer time to transmit a packet.

Some embodiments may take advantage of Wireless Fidelity (Wi-Fi) network. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs, relays, or stations (STAs) such as routers, switches, relays, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Many embodiments may relay communications from, e.g., a low-power sensor to a collection station or access point. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless network 100 comprising a plurality of communications devices including stations 130, 150 and 160, and relays 120 and 140. The wireless network 100 is the deployment of sensors such as stations 130, 150 and 160 within a large area with use of the relays 120 and 140. Relays 120 and 140 are often installed in locations that are not easily accessible such as telephone poles. For battery-operated relays, it may be desirable and, in some embodiments, required not to replace their batteries often.

Sensors such as stations 130, 150 and 160 may be inexpensive devices with very low power consumption capabilities. Therefore, both the sensors and the relays 120 and 140 may need to have long battery life and may need to remain in a power save mode as long as possible. However, a basic access mechanism of IEEE 802.11 is contention based collision avoidance in which each station and relay may need to receive and to examine channel transmissions to facilitate a collision avoidance operation. As a result, once a station or relay detects a packet; the station or relay has to receive the packet to determine if the packet conveys any information that impacts the operation of the station or relay such as a packet of a transmission that causes the station or relay to update a network allocation vector (NAV) duration. Many embodiments attempt to reduce the amount of time necessary for a station such as a sensor or relay to determine whether a packet needs to be processed by the station or whether the station can disregard the packet and return to a power save mode.

In the present embodiment, the stations 130, 150 and 160 the relays 120 and 140 may each implement prediction logic in the medium access control (MAC) sublayer to examine values of fields of a MAC-header of a frame of a packet to determine whether the content of the packet might have an impact on the operation of the stations 130, 150 and 160 the relays 120 and 140. In many embodiments, the prediction logic may process at least a portion of the MAC-header of the frame without performing a cyclic redundancy check (CRC). In several embodiments, the prediction logic may begin to examine field values of the portion of the MAC-header of the frame to determine whether the field values indicate the possibility that the frame may impact the operation of the station or relay. The prediction logic may, for instance, examine certain fields of the MAC-header for information such as an expected frame type, MAC-addresses, and other information prior to checking the correctness of CRC. If an expected MAC-address and control information are not detected, the station or relay may assume the packet has a CRC error or does not impact its operation. In response, the station or relay may perform an early termination of the receipt of the frame and enter or return to a power save mode without having processed the remaining portion of the header of the frame or the remaining portion of the frame such as the frame body and the frame check sequence field. On the other hand, if the prediction logic determines that the frame may impact the operation of the station or relay, the station or relay may receive the entire frame, the MAC sublayer logic may process the entire frame, the MAC sublayer logic may perform the CRC, and the MAC sublayer logic may determine the content of the frame if the CRC indicates that there is no error in receipt of the frame.

Figure 1A:
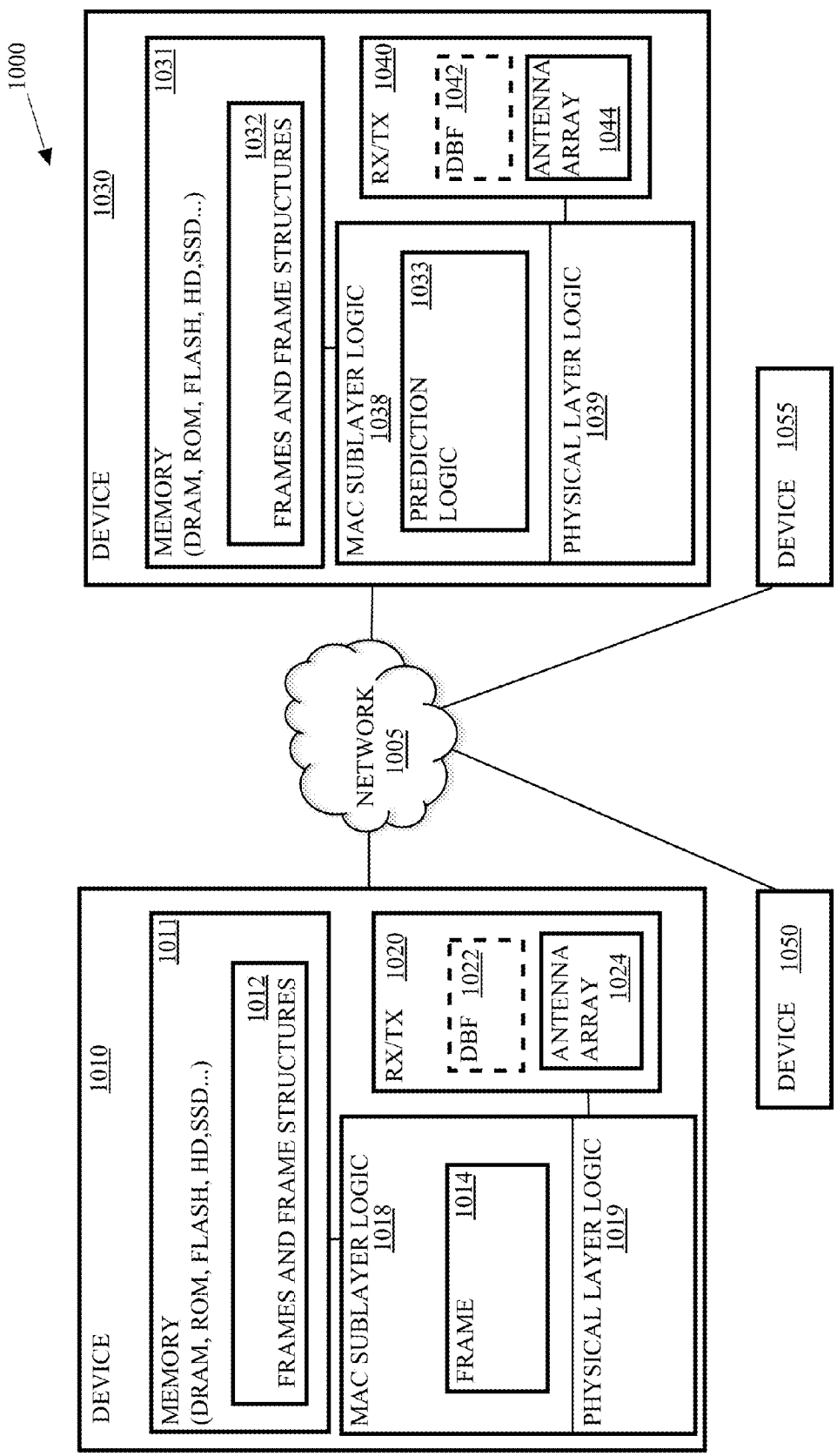
FIG. 1A depicts an embodiment of a wireless network comprising a plurality of communications devices.

FIG. 1A illustrates an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a relay, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices that may communicate with communications device 1010 directly or via the communications device 1030. For example, the communications device 1010 may comprise a metering substation for water consumption within a neighborhood of homes. Each of the homes within the neighborhood may comprise a sensor such as the communications device 1055 and the communications device 1055 may be integrated with or coupled to a water meter usage meter. And relays such as the communications device 1030 may be placed strategically in the neighborhood to relay communications from some of the more distant sensors from to the communications device 1010 or vice versa.

Initially, the communications device 1010 may determine a frame 1014 to transmit to the communication device 1055 either directly or via the communications device 1030. For instance, a frame builder of communications device 1014 may generate or select a frame 1014 based upon a frame structure 1012 in memory 1011 of the communications device 1010. The medium access control (MAC) sublayer logic 1018 may communicate the frame to physical layer (PHY) logic 1019 to transmit the frame 1014 to the communication device 1055.

The PHY logic 1019 may generate a preamble for the frame to encapsulate the frame and transmit the frame via a transceiver (RX/TX) 1020. The frame may comprise a frame with a MAC header that is identified as a management, control, or data frame type and a particular management, control, or data frame subtype. In further embodiments, the frame type may be a different frame type such a new frame type defined with reserved field values. Thereafter, the communications device 1010 may transmit the frame.

The communications device 1030 may receive the frame 1014 in the form of a packet. The packet may comprise the frame 1014 and, in some embodiments, one or more additional frames, encapsulated by the preamble. The PHY logic 1039 may decode the packet to decapsulate the frame 1014. As the PHY logic 1039 decodes the packet, the PHY logic 1039 may transmit selected fields of the MAC header of the frame 1014 to the MAC sublayer logic 1038. In other embodiments, the PHY logic 1039 may transmit all the fields of the MAC header to the MAC sublayer logic 1038 as the fields are decoded. In further embodiments, the PHY logic 1039 may decode one or more of the fields of the MAC header prior to transmitting the fields to the MAC sublayer logic 1038.

The MAC sublayer logic 1038 may comprise prediction logic 1033 to parse the selected fields of the frame 1014 based upon a frame structure 1032 in memory 1031 and examine one or more field values to determine whether the values of the selected fields of the header of the frame 1014 indicate that the frame might impact the operation of the communications device 1030. In many embodiments, the selected fields may include MAC address fields. The PHY logic 1039 may pass selected fields including the MAC address fields to the MAC sublayer logic 1038 as the symbols of the frame are decoded. The prediction logic 1033 may compare the MAC addresses to addresses known to the communications device 1030 such as addresses stored in the memory 1031 of the communications device 1030. If the addresses are not known or stored in the memory 1031, the MAC sublayer logic 1038 may examine other fields of the frame 1014 such as other fields in the MAC header to determine if the frame 1014 may have an impact on the operation of the communications device 1030. For instance, if the communications device 1030 is acting as a relay for the communications device 1055, the frame 1014 has an impact on the operation of the communications device 1030 because the communications device 1030 will encapsulate and re-transmit the frame 1014 to the communications device 1055. On the other hand, if the communications device 1030 is not acting as a relay, the operation of the communications device 1030 may still be impacted if the frame 1014 comprises a network allocation vector during which the communications device 1030 should refrain from transmitting.

After the prediction logic 1033 of the MAC sublayer logic 1038 examines at least a portion of the header of the frame 1014, if the prediction logic 1033 determines that the frame 1014 will not have an impact on the operation of the communications device 1030, the MAC sublayer logic 1038 may immediately terminate processing of the frame and, in some embodiments, instruct the PHY logic 1039 to terminate processing of the packet, and instruct the communications device 1030 to enter into or return to a power save mode, reducing or minimizing the consumption of power for the processing of the packet.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames such as the frames and/or the frame structures. In many embodiments, the frames may comprise fields based upon the structure of the standard frame structures identified in IEEE 802.11.

Figure 1B:
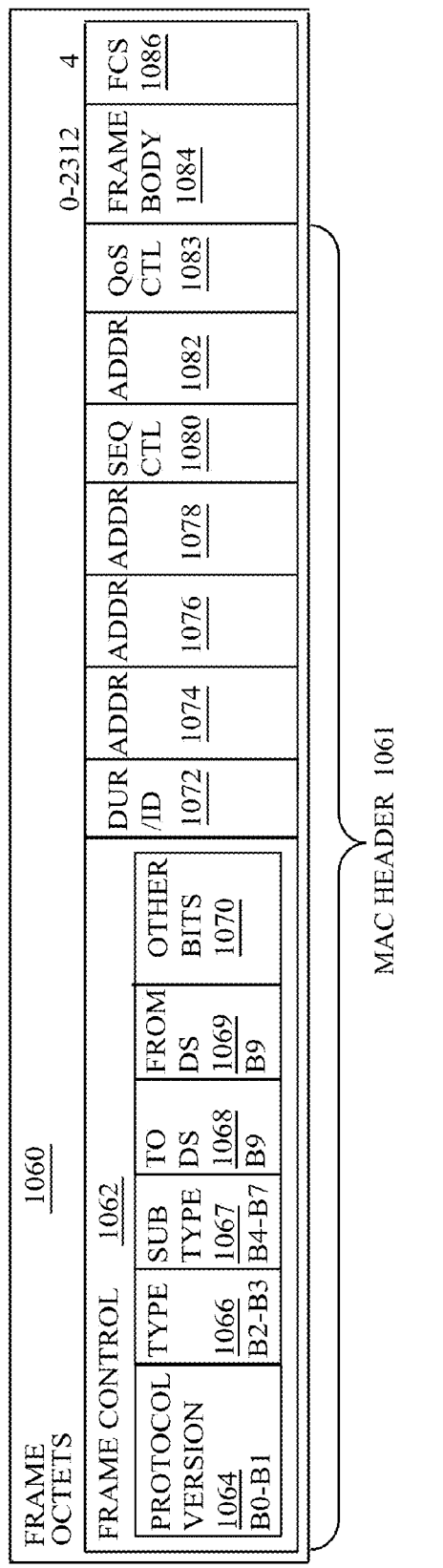
FIG. 1B depicts an embodiment of a medium access control sublayer frame such as the frame in FIG. 1A.

FIG. 1B illustrates an embodiment of a frame 1060. In other embodiments, the frame 1060 may have more or less fields, different fields, and/or fields with different field lengths. In the embodiment illustrated in FIG. 1B, the frame 1060 comprises a MAC header 1061 followed by a frame body field 1084 and a frame check sequence (FCS) field 1086. The frame body field 1084 may comprise one or more frames also referred to as MAC sublayer Service Data Units (MSDUs). The frame body 1084 may be a variable number of octets such as zero to 2312 octets and may include data elements, control elements, or parameters and capabilities. The FCS field 1086 may be four octets and may include extra checksum characters added to the frame 1060 for error detection and correction such as a cyclic redundancy check value.

The MAC header 1061 may comprise the frame control field 1062, a duration/identifier (DUR/ID) field 1066, an address (ADDR) field 1074, an ADDR field 1076, an ADDR field 1078, a Sequence Control (SEQ CTL) field 1080, an ADDR field 1082, and a quality of service control (QoS CTL) field 1083. The frame control field 1062 may be two octets such as the standard frame and may identify the type and subtype of the frame such as a control type and ready to send (RTS) subtype. One or more of the fields ADDR 1076, ADDR 1078, Sequence Control 1080, ADDR 1082, QoS control 1083, and frame body 1084 may only be present in certain frame types and subtypes of the frames.

The frame control field 1062 may comprise a protocol version field 1064, a type field 1066, a subtype field 1067, a TO DS field 1068, a FROM DS field 1069, and other frame control bits 1070. The protocol version field 1064 may be two bits in length (B0-B1). The value of the protocol version field 1064 may represent the revision of the corresponding standard that the frame represents. The type field 1066 may be two bits in length (B2-B3) and may identify the type of frame 1060 as, e.g., a management frame, a data frame, or a control frame. The subtype field 1067 may be four bits in length (B4-B7) and may identify the subtype of the frame 1060 as, e.g., a particular type of management frame, data frame, or control frame.

The TO DS field 1068 and the FROM DS field 1069 may be one bit in length each (B8-B9) and may identify information about the origin and/or destination of the frame. For instance, in some embodiments, if the value in the TO DS field 1068 is a logical zero and the value in the FROM DS field 1069 is a logical zero, the transmission may comprise a data frame transmitted direct from one STA to another STA within the same IBSS, a data frame transmitted direct from one non-AP STA to another non-AP STA within the same BSS, or a management or control frame. If the value in the TO DS field 1068 is a logical one and the value in the FROM DS field 1069 is a logical zero, the transmission may comprise a data frame destined for the DS or being sent by a STA associated with an AP to the Port Access Entity in that AP. If the value in the TO DS field 1068 is a logical zero and the value in the FROM DS field 1069 is a logical one, the transmission may comprise a data frame exiting the DS or being sent by the Port Access Entity in an AP. And if the value in the TO DS field 1068 is a logical one and the value in the FROM DS field 1069 is a logical one, the transmission may comprise a data frame using the four-address format and, in this latter situation, the prediction logic 1033 may determine whether the fourth address is a known address in the process of predicting whether the frame 1014 will have an impact on the operation of the communications device 1030.

Some embodiments may comprise prediction logic that examines the TO DS field 1068 and the FROM DS field 1069 to determine whether the frame 1060 might have an impact on the operation of a communications device. For instance, the TO DS field 1068 and the FROM DS field 1069 may indicate that the frame 1060 may comprise a fourth address field and/or may indicate the frame 1060 is a data frame.

In further embodiments, the prediction logic may examine the frame type field 1066 and the frame subtype field 1067 to determine whether the frame 1060 may have an impact on the operation of the communications device. For example, the frame type field 1066 and the frame subtype field 1067 may indicate that the frame is a particular type of management frame or control frame that might have an impact on the operation of the communications device.

After the TO DS field 1068 and the FROM DS field 1069 may be other bits 1070. The other bits 1070 may be used for additional frame control field parameters. In some embodiments, the one or more of the additional frame control field parameters may be examined by the prediction logic to determine whether the frame 1060 will have an impact on the operation of the communications device.

Referring again to FIG. 1A, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1019, 1039 to indicate that these frames are frames 1014. The PHY logic 1019, 1039 may generate physical layer protocol data units (PPDUs) based upon the frames 1014. More specifically, the frame builders may generate frames 1014 and the data unit builders of the PHY logic 1019, 1039 may encapsulate the frames 1014 with preambles to generate PPDUs for transmission via a physical layer device such as the transceivers (RX/TX) 1020 and 1040.

The frame 1014, also be referred to as a MAC layer Service Data Unit (MSDU), may comprise a management frame. For example, a frame builder of the MAC sublayer logic 1018 may generate a management frame such as the beacon frame to identify the communications device 1010 as having capabilities such as supported data rates, privacy settings, quality of service support (QoS), power saving features, cross-support, and a service set identification (SSID) of the network to identify the network to the communications device 1030.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1A may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard interval may be inserted between symbols such as the short training field (STF) and long training field (LTF) symbols during transmission to avoid inter-symbol interference (ISI), which might result from multi-path distortion. Guard tones help the signal conform to a spectral mask. The nulling of the direct component (DC) may be used to simplify direct conversion receiver designs.

In some embodiments, the communications devices 1010 and 1030 optionally comprise Digital Beam Formers (DBFs) 1022 and 1042, as indicated by the dashed lines. The DBFs 1022 and 1042 transform information signals into signals to be applied to elements of antenna arrays 1024 and 1044. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010.

Figure 2:
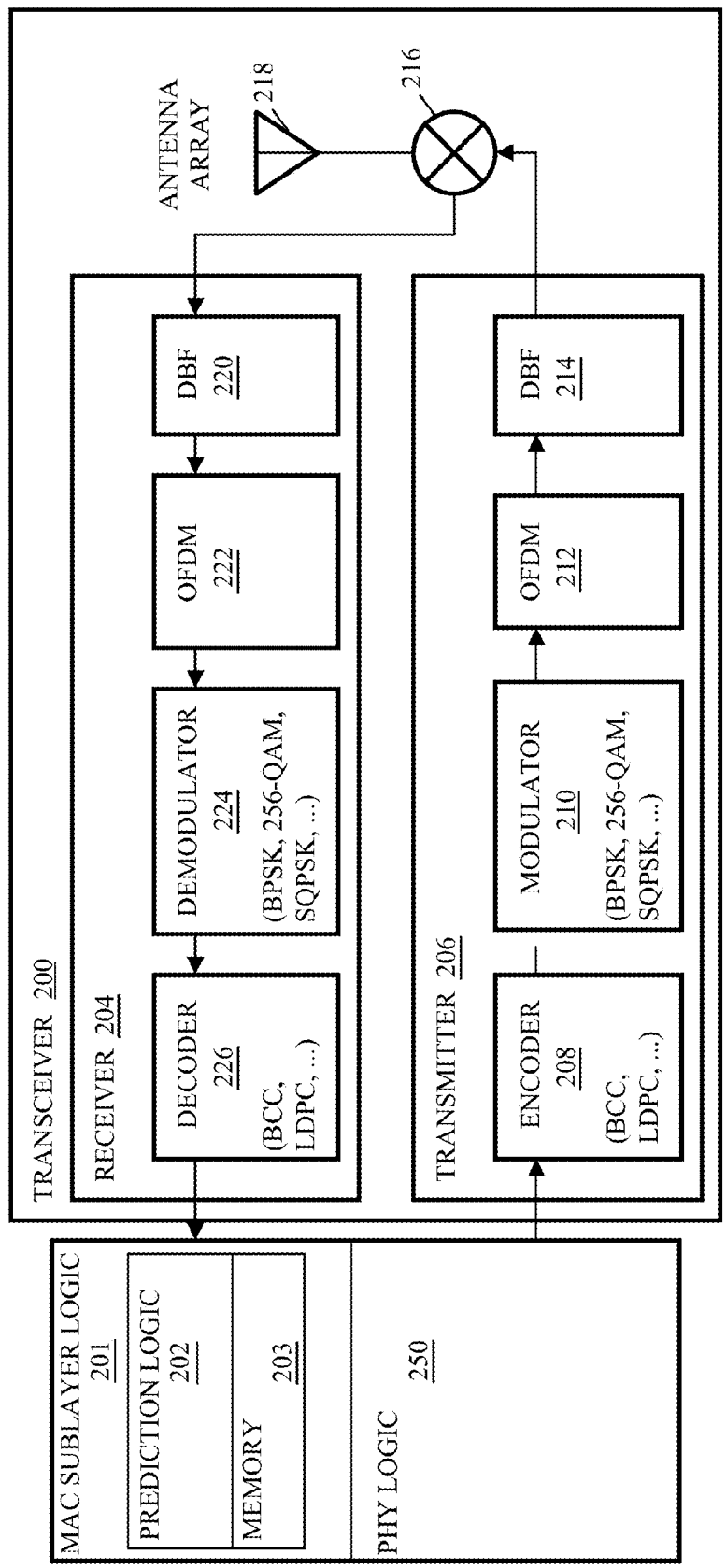
FIG. 2 depicts an embodiment of an apparatus to generate, transmit, receive and interpret a frame.

FIG. 2 depicts an embodiment of an apparatus to generate, communicate, transmit, receive, communicate, and interpret a frame. The apparatus comprises a transceiver 200 coupled with medium access control (MAC) sublayer logic 201. The MAC sublayer logic 201 may determine a frame and transmit the frame to the physical layer (PHY) logic 250. The PHY logic 250 may determine the PPDU by determining a preamble and encapsulating the frame with a preamble to transmit via transceiver 200. Other embodiments may comprise a transmitter 206 and a receiver 204, each having their own antenna or antenna array.

In many embodiments, the MAC sublayer logic 201 may comprise a frame builder to generate frames (MPDU) such as the frame illustrated in FIG. 1B and prediction logic 202 to predict whether a frame received via receiver 204 may impact the operation of a communications device. In several embodiments, the MAC sublayer logic 201 will only process fields of or selected fields of the MAC header of a frame unless the prediction logic 202 determines that the frame might have an impact on the operation of the MAC sublayer logic 201. For example, in some embodiments, the prediction logic 202 may receive fields of a MAC header of a frame defined in memory of the communications device and the prediction logic 202 may examine the values of the fields to determine whether the frame is destined for the communication device comprising the MAC sublayer logic 201. In some embodiments, the prediction logic 202 may examine the values of the address fields of the MAC header of a frame to determine if the frame is addressed to the communication device. In several embodiments, the prediction logic 202 may examine all the addresses of the MAC header until the prediction logic 202 determines that the frame will have an impact on the operation of the communications device. In some embodiments, if the prediction logic 202 does not determine that the addresses are associated with the communications device, the prediction logic 202 may determine whether the frame type and subtype fields have values that indicate that the frame may have an impact on the operations of the communications device.

In the present embodiment, the MAC sublayer logic 201 couples with memory 203 such as a buffer. The memory 203 may comprise part of the receiver 204, part of the transceiver 200, or may be external to the transceiver 200. The receiver 204 may communicatively couple with the memory 203 to store at least field values of the frame type and subtype as or after the fields are decoded. The prediction logic 202 may communicatively couple with the memory 203 to examine the values of the frame type and subtype fields to determine whether the frame may have an impact on the operation of the communications device.

For situations in which the prediction logic 202 determines that a frame will not have an impact on the operation of the MAC sublayer logic 201, the MAC sublayer logic 201 may terminate processing of the frame, instruct the PHY logic 250 to terminate processing of the packet, and issue an instruction to enter into a power save mode without fully processing the frame of the packet, without processing the frame check sequence field, and, in many embodiments, without fully processing the fields of the MAC header of the frame. For situations in which more than one frame is encapsulated by the packet, the MAC sublayer logic 201 may terminate any further processing of the frame that will not have an impact on the operations of the MAC sublayer logic 201 and proceed to examiner fields of the MAC header of the subsequent frame, if applicable.

The PHY logic 250 may comprise a data unit builder. The data unit builder may determine a preamble and the PHY logic 250 may encapsulate an MPDU generated by the MAC sublayer logic 201 with the preamble to generate a PPDU. In many embodiments, the data unit builder may create the preamble based upon communications parameters chosen through interaction with a destination communications device.

The transceiver 200 comprises the receiver 204 and the transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise the receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201. In many embodiments, selected fields of a frame of the received data may be communicated to the MAC sublayer logic 201 as the selected fields are decoded. In some embodiments, some selected fields may be buffered in the memory 203 as the fields are decoded.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing. In some embodiments, for instance, the transceiver 200 may comprise one or more processors and memory including code to perform functions of the transmitter 206 and/or receiver 204.

Figure 3A:
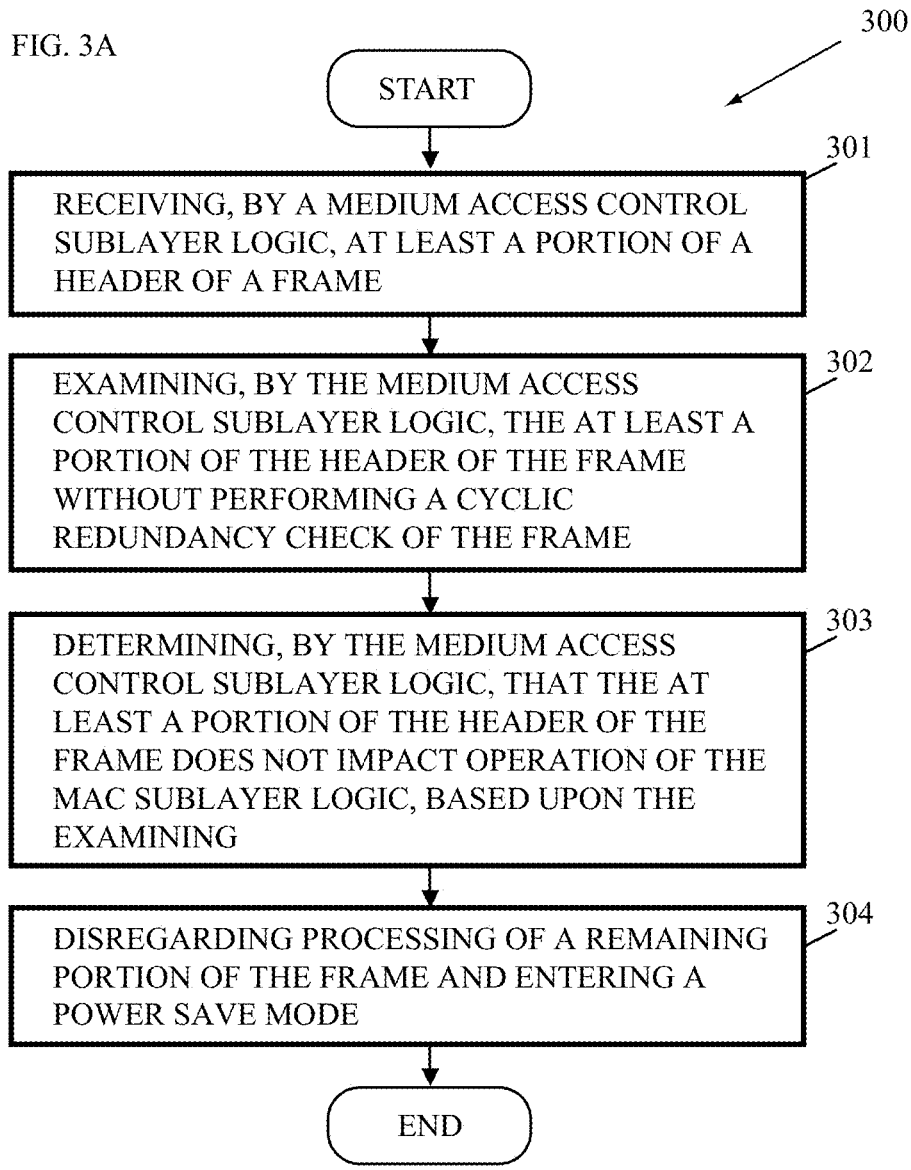
FIGS. 3A-B depict embodiments of flowcharts to decode communications by wireless receivers.
Figure 3B:
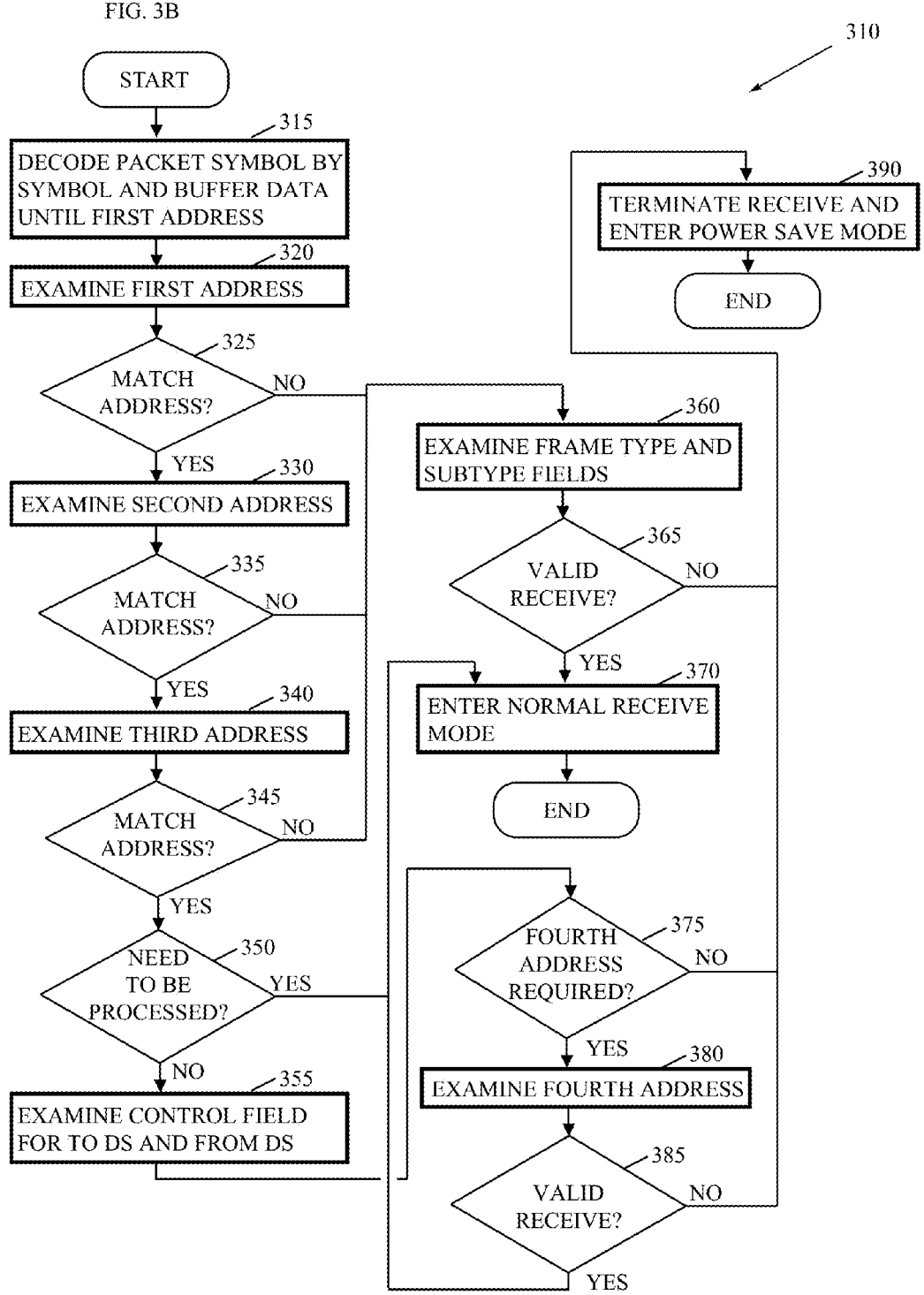

FIGS. 3A-B depict embodiments of flowcharts 300 and 310 to receive a frame and begin to examine a header of the frame prior to performing a cyclic redundancy check or without performing a cyclic redundancy check if the frame is predicted to have no impact on the operation of a communications device. In particular, FIG. 3A depicts an embodiment of a flowchart 300 to predict whether a frame will impact the operation of the communications device. The flowchart 300 begins with a medium access control (MAC) sublayer logic receiving at least a portion of a header of a frame (element 301). In some embodiments, the MAC sublayer logic may receive a frame control field or at least sub-fields of the frame control field. In some of these embodiments, the MAC sublayer logic may store the at least a portion of the header of the frame such as the frame control field, or portions thereof, in a buffer for later examination. For instance, the MAC sublayer logic may receive the frame type and subtype fields of the frame control field and store these in the buffer. In other embodiments, the PHY logic may store the frame type and subtype fields of the frame control field in the buffer.

In some embodiments, the MAC sublayer logic may receive one or more addresses of the frame. In several embodiments, receiving the at least a portion of the frame may comprise receiving from the PHY, field values from the header of the frame as the at least a portion of the header of the frame is decoded. In further embodiments, receiving the at least a portion of the header of the frame may comprise receiving from the PHY, frame type and subtype field values from the header of the frame.

The MAC sublayer logic may comprise prediction logic to examine the at least a portion of the header of the frame without performing a cyclic redundancy check of the frame (element 302). In several embodiments, examining the at least a portion of the header of the frame without performing a cyclic redundancy check of the frame may comprise examining the at least a portion of the frame before the frame check sequence field value is decoded by the PHY. In many embodiments, examining the at least a portion of the header of the frame without performing a cyclic redundancy check of the frame may comprise comparing one or more addresses from the header of the frame against addresses previously associated with the MAC sublayer logic or by comparing the addresses to addresses known to the communications device. In further embodiments, examining the at least a portion of the header of the frame without performing a cyclic redundancy check of the frame may comprise examining frame type and subtype values to determine if the frame comprises a network allocation vector.

Prediction logic of the MAC sublayer logic may determine that the at least a portion of the header of the frame does not impact operation of the medium access control sublayer logic, based upon the examining (element 303). For example, the prediction logic may determine that the frame is either not addressed to the communications device or has an error.

In response to determining that the at least a portion of the header of the frame does not impact operation of the MAC sublayer logic (or the communications device), the MAC sublayer logic may disregard processing of a remaining portion of the frame and enter a power save mode (element 304). In many embodiments, the MAC sublayer logic may disregard the processing of the unprocessed portion of the header of the frame as well as the frame body, if applicable, and the frame check sequence field. In further embodiments, the MAC sublayer logic may instruct the PHY to terminate or otherwise stop processing the packet or at least the frame. In further embodiments, the MAC sublayer logic may receive at least a portion of a header of a second frame; examine the at least a portion of the header of the second frame without performing a cyclic redundancy check (CRC) of the second frame; determine that the at least a portion of the header of the second frame might impact operation of the MAC sublayer logic, based upon the examining; process the remaining portion of the frame including the frame body (if applicable) and the frame check sequence; perform the CRC of the second frame; and parse the second frame.

FIG. 3B depicts an embodiment of a flowchart 300 to decode communications by wireless receivers. The flowchart 300 begins with a PHY logic decoding a packet symbol by symbol and buffering the data decoded until the PHY logic decodes a first address, at which time the first address is communicated to MAC sublayer logic (element 315). In many embodiments, the prediction logic of the MAC sublayer logic will terminate processing of the frame or the packet in response to the prediction logic determining that the frame will not impact the operation of the communications device.

The MAC sublayer logic may immediately examine selected content of MAC-header as decoded symbols are available to the MAC sublayer logic and prior to the CRC (elements 320, 330, and 340). In the present embodiment, the MAC sublayer logic examines the first, second, and third Address Fields for expected or known MAC addresses. If the MAC addresses are expected or known (elements 325, 335, and 345) and the packet needs to be processed based upon the addresses (element 350), the MAC sublayer logic progresses to element 370 to enter a normal receive or processing mode. The normal receive mode may involve processing the remaining portion of the frame, performing the CRC after the packet is decoded, and parsing the frame(s) of the packet to determine the impact on the operation of the MAC sublayer logic.

If, however, any of the address fields are not in the list of addresses it needs to process (element 350), the MAC sublayer logic examines other information elements of the MAC-header to intelligently predict (a) a CRC error or (b) a packet that carries no information for it and/or has no impact on its operation. For instance, the MAC sublayer logic may examine the frame type field and the frame subtype field of the control field (element 360) to determine whether the receipt of the packet is valid (element 365). The frame type field and the frame subtype field may indicate that the packet comprises information such as a network allocation vector (NAV) that the MAC sublayer logic should use to defer transmissions for the duration indicated by the NAV. If the receipt of the packet is valid (element 365) then the MAC sublayer logic may enter the normal receive mode (element 370). If the receipt of the packet is not valid (element 365), indicating that the packet has a CRC error or has no impact on the operation of the MAC sublayer logic, then the MAC sublayer logic may proceed to terminate the receipt of the packet, terminate further processing of the frame, and enter or return to a power save mode (element 390). In many embodiments, terminating further processing of the frame comprises terminating further processing of the packet by the PHY logic and terminating further processing of the frame by the MAC sublayer logic.

If all of the address fields match addresses in a list of expected or known addresses (elements 325, 335, and 345) but do not indicate to the MAC sublayer logic that the MAC sublayer logic needs to process the packet (element 350), the MAC sublayer logic may examine the TO DS field and the FROM DS field of the control field (element 355) to determine whether there is a fourth address field in the packet. If there is a fourth address field in the packet (element 375), the MAC sublayer logic may examine the fourth address by comparing the fourth address to expected or known addresses (element 380). If the fourth address is expected or known and indicates that the MAC sublayer logic should process the packet (element 385), the MAC sublayer logic may enter the normal receive mode (element 370) to receive and parse the entire packet. On the other hand, if the packet does not contain a fourth address (element 375) or the fourth address does not indicate that the receipt of the packet by the MAC sublayer logic is valid (element 385), the MAC sublayer logic may proceed to terminate the receipt of the packet and enter or return to a power save mode (element 390).

In many embodiments, once the prediction logic predicts that the MAC sublayer logic does not need to process the packet, the MAC sublayer logic may proceed to early termination of the receive procedure, disregarding processing of the packet and entering a low power consumption mode (element 390). For example, the prediction logic may fail at element 365 while there was no CRC error. The existence of elements 365, 375 and 385 may guarantee that if the packet carries useful information for the MAC sublayer logic, the prediction logic is directed back to element 370 to enter the normal receive mode. However, if the packet with correct CRC carries no useful information, it is terminated early without the MAC sublayer logic processing the frame beyond the header of the frame or at least selected fields of the header of the frame, allowing the station to return to a power save mode (element 390).

In further embodiments, once the prediction logic predicts that the MAC sublayer logic does need to process the packet, the MAC sublayer logic may proceed to a normal receive mode (element 370) to receive the packet, process the remaining portion of the packet, perform the CRC, and parse the packet for data. For example, the prediction logic may fail at element 365 erroneously because, e.g., an unchecked CRC error causes an invalid MAC address to be handled as a valid receive (element 365). As a result, the MAC sublayer logic follows the normal operation in the normal receive mode (element 370) and will perform the CRC.

Figure 4:
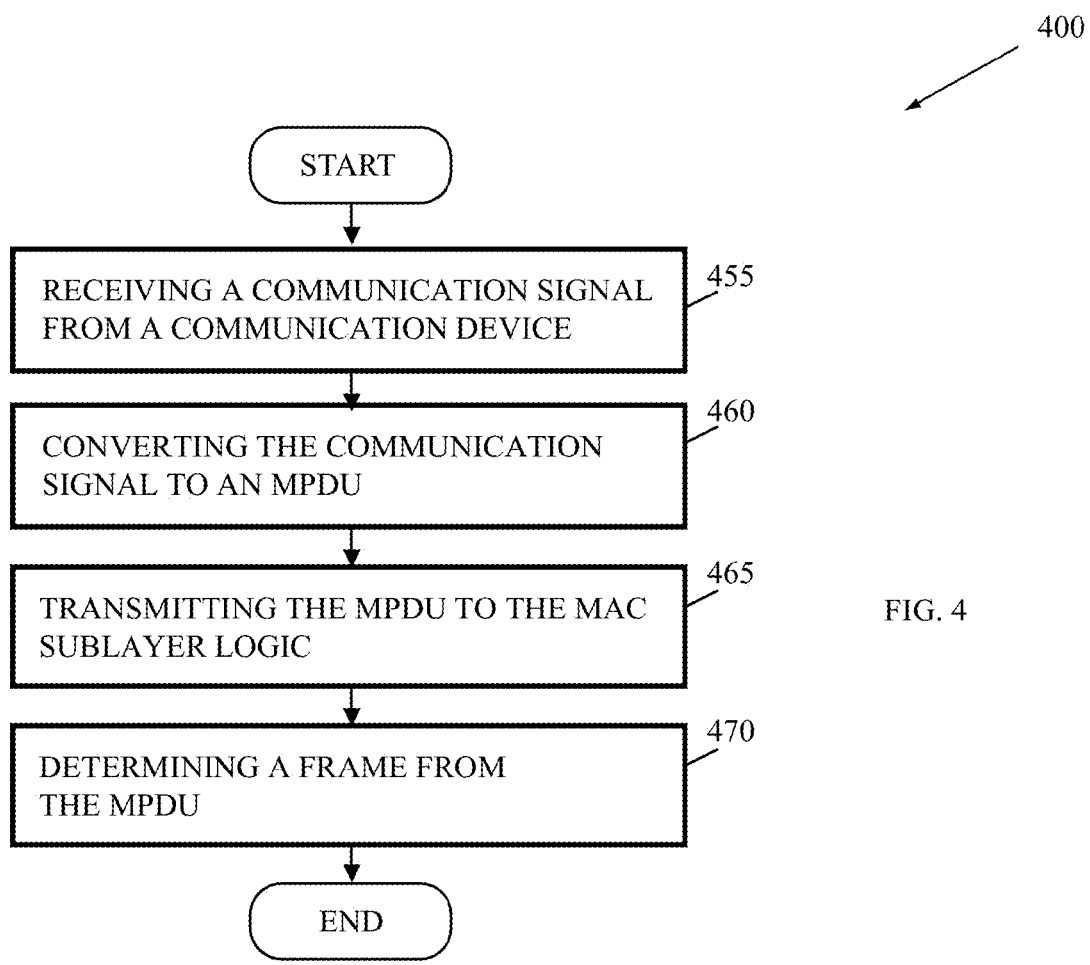
FIG. 4 depicts an embodiment of a flowchart to receive and decode communications by wireless receivers as illustrated in FIG. 2.

FIG. 4 depicts an embodiment of a flowchart 400 to receive and interpret communications with a frame such as the frame 1014 illustrated in FIG. 1A. The flowchart 400 may begin with a receiver of an access point such as the receiver 204 in FIG. 2 receiving a communication signal via one or more antenna(s) such as an antenna element of antenna array 218 (element 455). The receiver may convert the communication signal into an MPDU in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465). In many embodiments, the decoder may transmit fields of the MPDU to the MAC sublayer logic as the fields are decoded.

The MAC sublayer logic may determine frame field values from the MPDU (element 470) such as the frame 1060 fields in FIG. 1B. For instance, the MAC sublayer logic may determine frame field values such as the type and subtype field values of the frame control field and/or the field values of the TO DS and FROM DS fields of the frame control field.

The following examples pertain to further embodiments. One example comprises a method. The method may involve receiving, by a medium access control sublayer logic, at least a portion of a frame; examining, by the medium access control sublayer logic, the at least a portion of the frame without performing a cyclic redundancy check of the frame; determining, by the medium access control sublayer logic, that the at least a portion of the frame does not impact operation of the medium access control sublayer logic, based upon the examining; and disregarding the frame and entering a power save mode without performing the cyclic redundancy check of the frame.

In some embodiments, the method may further comprise receiving, by a medium access control sublayer logic, at least a portion of a second frame; examining, by the medium access control sublayer logic, the at least a portion of the second frame without performing a cyclic redundancy check of the second frame; determining, by the medium access control sublayer logic, that the at least a portion of the second frame might impact operation of the medium access control sublayer logic, based upon the examining; performing the cyclic redundancy check of the second frame; and parsing the second frame. In some embodiments, the method may further comprise storing, by the medium access control sublayer logic, at least part of the frame in memory. In many embodiments, receiving, by the medium access control sublayer logic, the at least a portion of the frame comprises receiving from a physical layer, one or more addresses from a header of the frame. In several embodiments, receiving, by the medium access control sublayer logic, the at least a portion of the frame comprises receiving from a physical layer, field values from a header of the frame as the at least a portion of the frame is decoded. In further embodiments, receiving, by the medium access control sublayer logic, the at least a portion of the frame comprises receiving from a physical layer, frame type and subtype field values from a header of the frame. In some embodiments, examining, by the medium access control sublayer logic, the at least a portion of the frame without performing a cyclic redundancy check of the frame comprises examining the at least a portion of the frame before the frame check sequence field value is decoded by the physical layer. In some embodiments, examining, by the medium access control sublayer logic, the at least a portion of the frame without performing a cyclic redundancy check of the frame comprises comparing one or more addresses from a header of the frame against addresses previously associated with the medium access control sublayer logic. And in some embodiments, examining, by the medium access control sublayer logic, the at least a portion of the frame without performing a cyclic redundancy check of the frame comprises examining frame type and subtype values to determine if the frame comprises a network allocation vector.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control sublayer logic to receive at least a portion of a frame; examine the at least a portion of the frame without performing a cyclic redundancy check of the frame; determine that the at least a portion of the frame does not impact operation of the medium access control sublayer logic, based upon examining the at least a portion of the frame; and disregard the frame and enter a power save mode without performing the cyclic redundancy check of the frame; and a physical layer coupled with the medium access control sublayer logic to receive and decode the at least a portion of the frame.

In some embodiments, the apparatus may further comprise an antenna to transmit the frame encapsulated by the preamble. In some embodiments, the apparatus may further comprise memory to store at least part of the frame. In further embodiments of the apparatus, the medium access control sublayer logic comprises logic to receive at least a portion of a second frame; examine the at least a portion of the second frame without performing a cyclic redundancy check of the second frame; determine that the at least a portion of the second frame might impact operation of the medium access control sublayer logic, based upon examining the at least a portion of the second frame; perform the cyclic redundancy check of the second frame; and parse the second frame. In some embodiments of the apparatus, the medium access control sublayer logic comprises logic to receive from the physical layer, field values from a header of the frame as the at least a portion of the frame is decoded. In some embodiments of the apparatus, the medium access control sublayer logic comprises logic to receive from the physical layer, from the physical layer, frame type and subtype field values from a header of the frame. In some embodiments of the apparatus, the medium access control sublayer logic comprises logic to examine the at least a portion of the frame before the frame check sequence field value is decoded by the physical layer. In some embodiments of the apparatus, the medium access control sublayer logic comprises logic to compare one or more addresses from a header of the frame against addresses previously associated with the medium access control sublayer logic. In some embodiments of the apparatus, the medium access control sublayer logic comprises logic to examine frame type and subtype values to determine if the frame comprises a network allocation vector. And in some embodiments of the apparatus, the physical layer logic comprises logic to transmit one or more addresses of a medium access control header of the frame to the medium access control sublayer logic and to store a frame type field value and a subtype field value in a buffer as the frame is being decoded.

Another example comprises a system. The system may comprise a medium access control sublayer logic to receive at least a portion of a frame; examine the at least a portion of the frame without performing a cyclic redundancy check of the frame; determine that the at least a portion of the frame does not impact operation of the medium access control sublayer logic, based upon examining the at least a portion of the frame; and disregard the frame and enter a power save mode without performing the cyclic redundancy check of the frame; a physical layer coupled with the medium access control sublayer logic to receive and decode the at least a portion of the frame; and an antenna coupled with the physical layer logic to receive the frame.

In some embodiments, the system may further comprise memory to store at least part of the frame. In further embodiments of the system, the medium access control sublayer logic comprises logic to generate the frame with a medium access control header having a structure defined for a frame. In further embodiments of the system, the medium access control sublayer logic comprises logic to receive at least a portion of a second frame; examine the at least a portion of the second frame without performing a cyclic redundancy check of the second frame; determine that the at least a portion of the second frame might impact operation of the medium access control sublayer logic, based upon examining the at least a portion of the second frame; perform the cyclic redundancy check of the second frame; and parse the second frame. In some embodiments of the system, the medium access control sublayer logic comprises logic to receive from the physical layer, field values from a header of the frame as the at least a portion of the frame is decoded. In some embodiments of the system, the medium access control sublayer logic comprises logic to receive from the physical layer, from the physical layer, frame type and subtype field values from a header of the frame. In some embodiments of the system, the medium access control sublayer logic comprises logic to examine the at least a portion of the frame before the frame check sequence field value is decoded by the physical layer. In some embodiments of the system, the medium access control sublayer logic comprises logic to compare one or more addresses from a header of the frame against addresses previously associated with the medium access control sublayer logic. In some embodiments of the system, the medium access control sublayer logic comprises logic to examine frame type and subtype values to determine if the frame comprises a network allocation vector. And in some embodiments of the system, the physical layer logic comprises logic to transmit one or more addresses of a medium access control header of the frame to the medium access control sublayer logic and to store a frame type field value and a subtype field value in a buffer as the frame is being decoded.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, e-fuse, or the like. Still further features may be selected by a user after via a selectable preference such as a software preference, an e-fuse, or the like.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

The logic as described above may be part of the design for an integrated circuit chip. The chip design can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the graphical computer programming language of the design by physical means (e.g., by providing a copy of the storage medium storing the design) or electronically (e.g., through the Internet) to such entities, directly or indirectly. The design may then be converted into the appropriate format (e.g., GDSII) for the fabrication of photolithographic masks, which typically include multiple copies of the chip design in question that are to be formed on a wafer. The photolithographic masks can be utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip can be mounted in a single chip package (such as a plastic carrier, with leads that are affixed to a motherboard or other higher level carrier) or in a multichip package (such as a ceramic carrier that has either or both surface interconnections or buried interconnections). In any case, the chip may then be integrated with other chips, discrete circuit elements, and/or other signal processing devices as part of either (a) an intermediate product, such as a motherboard, or (b) an end product. The end product can be any product that comprises integrated circuit chips, ranging from toys and other low-end applications to advanced computer products such as mobile devices having, e.g., a display, a keyboard or other input device, and a processor.

It will be apparent to those skilled in the art having the benefit of this disclosure that the present disclosure contemplates a mechanism of decoding frames. It is understood that the form of the embodiments shown and described in the detailed description and the drawings are to be taken merely as examples. It is intended that the following claims be interpreted broadly to embrace all variations of the example embodiments disclosed.

The disclosure of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method to decode communications by a device, the method comprising:
receiving at least a portion of a header of a frame;
examining the at least a portion of the header of the frame without performing a cyclic redundancy check of the frame, wherein examining the at least a portion of the header of the frame without performing a cyclic redundancy check of the frame comprises examining frame type and subtype values to determine if the frame comprises a network allocation vector;

determining that the at least a portion of header of the frame does not impact operation of the device, based upon the examining; and disregarding processing of a remaining portion of the frame and entering a power save mode.

2. The method of claim 1, further comprising:

receiving at least a portion of a header of a second frame;

examining the at least a portion of the header of the second frame without processing a frame body of the second frame, or performing a cyclic redundancy check, of the second frame;

determining that the at least a portion of the header of the second frame might impact operation of the device, based upon the examining;

processing the remaining portion of the frame and performing the cyclic redundancy check of the second frame; and parsing the second frame.

3. The method of claim 1, further comprising storing at least part of the frame in memory.

4. The method of claim 1, wherein receiving the at least a portion of the header of the frame comprises receiving from a physical layer, one or more addresses from the header of the frame.

5. The method of claim 1, wherein receiving the at least a portion of the header of the frame comprises receiving from a physical layer, field values from the header of the frame as the at least a portion of the header of the frame is decoded.

6. The method of claim 1, wherein receiving the at least a portion of the header of the frame comprises receiving from a physical layer, frame type and subtype field values from the header of the frame.

7. The method of claim 1, wherein examining the at least a portion of the header of the frame without performing a cyclic redundancy check of the frame comprises examining the at least a portion of the header of the frame before the frame check sequence field value is decoded by the physical layer.

8. The method of claim 1, wherein examining the at least a portion of the header of the frame without performing a cyclic redundancy check of the frame comprises comparing one or more addresses from the header of the frame against addresses previously associated with the device.

9. An apparatus to decode communications, the apparatus comprising:

medium access control logic to receive at least a portion of a header of a frame; examine the at least a portion of the header of the frame without performing a cyclic redundancy check of the frame, wherein examination of the at least a portion of the header of the frame without performing a cyclic redundancy check of the frame comprises examination of frame type and subtype values to determine if the frame comprises a network allocation vector; determine that the at least a portion of the header of the frame does not impact operation of the medium access control logic, based upon examining the at least a portion of the header of the frame; and disregard processing of a remaining portion of the frame and enter a power save mode; and a physical layer coupled with the medium access control logic to receive and decode the at least a portion of the frame.

10. The apparatus of claim 9, further comprising memory to store at least part of the frame.

11. The apparatus of claim 9, wherein the medium access control logic comprises logic to receive at least a portion of a header of a second frame; examine the at least a portion of the header of the second frame without processing a frame body of the second frame and without performing a cyclic redundancy check of the second frame; determine that the at least a portion of the header of the second frame might impact operation of the medium access control logic, based upon examining the at least a portion of the header of the second frame; process a remaining portion of the second frame and perform the cyclic redundancy check of the second frame; and parse the second frame.

12. The apparatus of claim 9, wherein the medium access control logic comprises logic to receive from the physical layer, one or more addresses from the header of the frame.

13. The apparatus of claim 9, wherein the medium access control logic comprises logic to receive from the physical layer, field values from the header of the frame as the at least a portion of the header of the frame is decoded.

14. The apparatus of claim 9, wherein the medium access control logic comprises logic to receive from the physical layer, from the physical layer, frame type and subtype field values from the header of the frame.

15. The apparatus of claim 9, wherein the medium access control logic comprises logic to examine the at least a portion of the header of the frame before the frame check sequence field value is decoded by the physical layer.

16. The apparatus of claim 9, wherein the medium access control logic comprises logic to compare one or more addresses from the header of the frame against addresses previously associated with the medium access control logic.

17. The apparatus of claim 9, wherein the physical layer comprises logic to transmit one or more addresses of the header of the frame to the medium access control logic and to store frame type and subtype values in a buffer as the frame is being decoded.

18. A system to decode communications, the system comprising:

medium access control logic to receive at least a portion of a header of a frame; examine the at least a portion of the header of the frame without performing a cyclic redundancy check of the frame, wherein examination of the at least a portion of the header of the frame without performing a cyclic redundancy check of the frame comprises examination of frame type and subtype values to determine if the frame comprises a network allocation vector; determine that the at least a portion of the header of the frame does not impact operation of the medium access control logic, based upon examining the at least a portion of the header of the frame; and disregard processing of a remaining portion of the frame and enter a power save mode;

a physical layer coupled with the medium access control logic to receive and decode the at least a portion of the frame; and an antenna coupled with the physical layer logic to receive the frame.

19. The system of claim 18, further comprising memory to store at least part of the frame.

20. The system of claim 18, wherein the medium access control logic comprises logic to receive at least a portion of a header of a second frame; examine the at least a portion of the header of the second frame without processing a frame body of the second frame and without performing a cyclic redundancy check of the second frame; determine that the at least a portion of the header of the second frame might impact operation of the medium access control logic, based upon examining the at least a portion of the header of the second frame;

process a remaining portion of the second frame and perform the cyclic redundancy check of the second frame; and parse the second frame.

21. The system of claim 18, wherein the medium access control logic comprises logic to receive from the physical layer, one or more addresses from the header of the frame.

22. The system of claim 18, wherein the medium access control logic comprises logic to receive from the physical layer, field values from the header of the frame as the at least a portion of the header of the frame is decoded.

23. The system of claim 18, wherein the medium access control logic comprises logic to receive from the physical layer, from the physical layer, frame type and subtype field values from the header of the frame.

24. The system of claim 18, wherein the medium access control logic comprises logic to examine the at least a portion of the header of the frame before the frame check sequence field value is decoded by the physical layer.

25. The system of claim 18, wherein the physical layer comprises logic to transmit one or more addresses of the header of the frame to the medium access control logic and to store frame type and subtype values in a buffer as the frame is being decoded.

26. A computer program product to decode communications, the computer program product comprising:
    a non-transitory computer useable medium having a computer useable program code embodied therewith, the computer useable program code comprising computer useable program code configured to perform operations, the operations comprising:
    receiving at least a portion of a header of a frame;
    examining the at least a portion of the header of the frame without performing a cyclic redundancy check of the frame, wherein examining the at least a portion of the header of the frame without performing a cyclic redundancy check of the frame comprises examining frame type and subtype values to determine if the frame comprises a network allocation vector;
    determining that the at least a portion of header of the frame does not impact operation of the medium access control sublayer logic, based upon the examining; and
    disregarding processing of a remaining portion of the frame and entering a power save mode.

27. The computer program product of claim 26, further comprising:
    receiving at least a portion of a header of a second frame;
    examining the at least a portion of the header of the second frame without processing a frame body of the second frame, or performing a cyclic redundancy check, of the second frame;
    determining that the at least a portion of the header of the second frame might impact operation of the medium access control sublayer logic, based upon the examining;
    processing a remaining portion of the second frame and performing the cyclic redundancy check of the second frame; and
    parsing the second frame.

28. The computer program product of claim 26, wherein examining the at least a portion of the header of the frame without performing a cyclic redundancy check of the frame comprises examining the at least a portion of the frame before the frame check sequence field value is decoded by the physical layer.

* * * * *